UNITED STATES PATENT OFFICE.

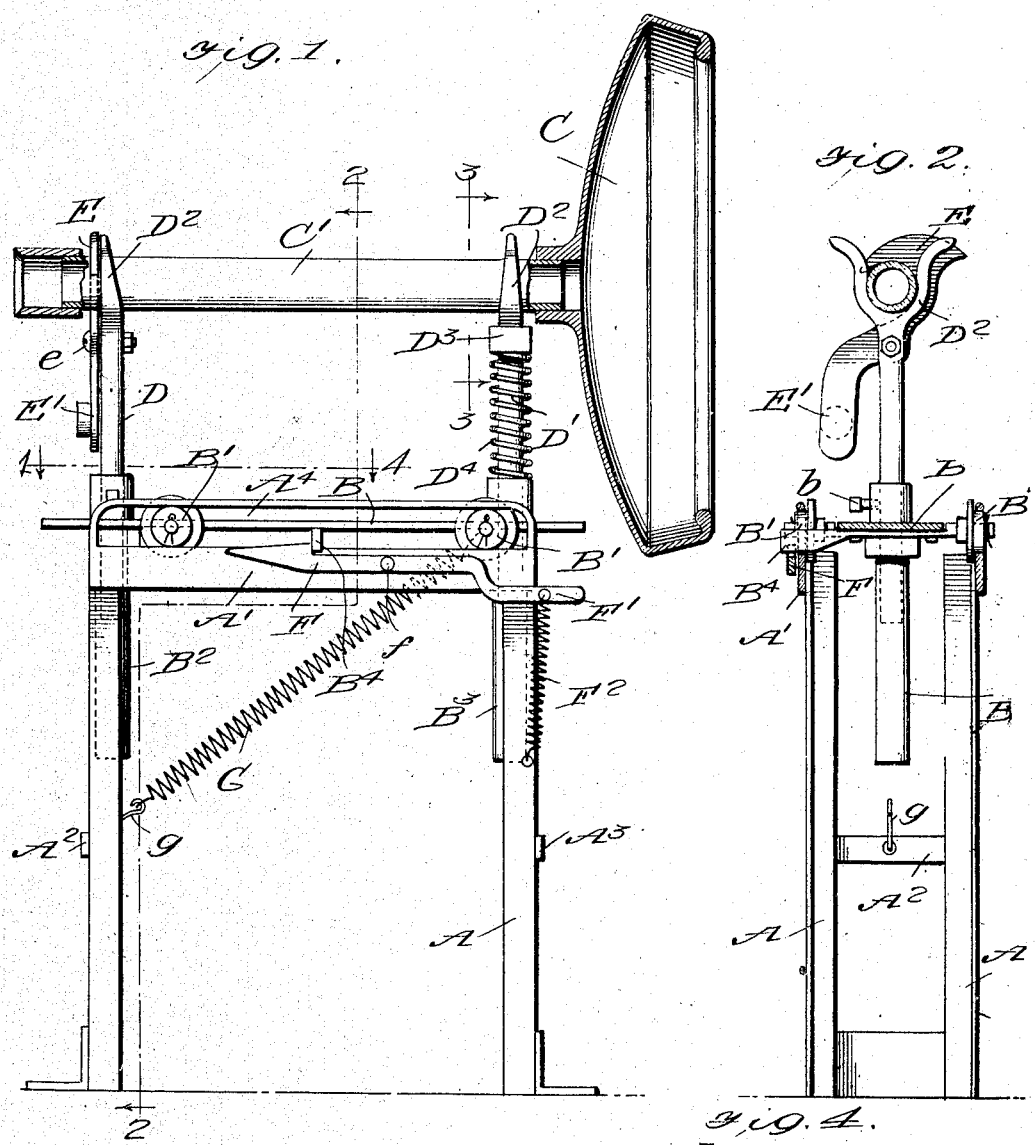

SETH B. HENSHAW, OF CHARLESTON, WEST VIRGINIA, ASSIGNOR TO CHARLESTON WINDOW GLASS CO., OF CHARLESTON, WEST VIRGINIA, A CORPORATION OF WEST VIRGINIA.

BAIT OR DRAWING-TOOL HOLDING DEVICE.

1,174,719.  Specification of Letters Patent.  Patented Mar. 7, 1916.

Application filed August 5, 1915. Serial No. 43,809.

*To all whom it may concern:*

Be it known that I, SETH B. HENSHAW, a citizen of the United States, and a resident of Charleston, in the county of Kanawha and State of West Virginia, have invented certain new and useful Improvements in Bait or Drawing-Tool Holding Devices, of which the following is a specification.

My present invention relates generally to window glass machines, and more particularly to a device for holding the bait or drawing tool during what is known as the capping of the glass cylinder initially drawn and, during which capping operation the cylinder, supported in a horizontal position, is cut into a plurality of lengths which are thereafter split longitudinally and flattened in the flattening furnace, as is well known in the art, the device forming the subject matter of this invention being designed to hold the bait or drawing tool which is, at the beginning of the capping operation, still attached to the head end of the drawn cylinder.

The object of my invention is to provide a simple and effective support for the bait or drawing tool which will enable the strain of its weight being taken from the cylinder laid out for capping, and which will withdraw the bait a sufficient distance from the cylinder after the latter is cut off from the bait, to prevent checking or chipping of the adjacent cylinder end.

I have shown such a device as embodies my invention in the accompanying drawing, the same being better understood from the following description, referring to the drawing in which—

Figure 1 is a side elevation of the device with a bait or drawing tool held therein. Fig. 2 is a vertical transverse section taken therethrough substantially on line 2—2 of Fig. 1. Fig. 3 is a detail vertical transverse section through the upper portion of the device, taken substantially on line 3—3 of Fig. 1, and Fig. 4 is a detail horizontal section taken substantially on line 4—4 of Fig. 1.

Referring now to these figures, my improved device includes a generally rectangular stand which stand comprises uprights A connected at their upper ends by longitudinal side bars A', and connected intermediate their ends by cross pieces A² and A³, all as best seen by reference to Figs. 1 and 2, the said upper longitudinal side bars A' being provided with longitudinal slots A⁴ forming guides for rollers B' carried at the relatively opposite sides of a horizontally movable carriage B, this carriage having as will be plainly seen by reference to Fig. 1, a limited movement by virtue of the travel of its rollers B' before mentioned in the slots A⁴, the rollers so confined in the slots preventing the carriage B from tilting under the weight and strain of the bait C.

Adjacent its forward and rear ends, the movable carriage B is provided with centrally disposed vertical tubes B² and B³, these tubes receiving the lower ends of vertically extending posts D and D', the upper ends of which posts are provided with upwardly opening U-shaped extensions D² to receive the bait pipe C' as clearly seen in Figs. 1 and 2.

The post D is adjustably secured in its respective socket or tube B², by means of a set screw b, while the post D' at that side of the device nearest the cylinder carried by the bait C, is provided with an upper rigid collar D³ and with a compression spring D⁴ coiled therearound between the said collar and the upper end of its socket or tube B³ in which it is loosely disposed, thus providing for a spring support for the bait C to take up any strain upon the glass cylinder carried thereby, before it is cut off.

A bait pipe clasping hook E is intermediately pivoted adjacent the upper end of the upright post D, at e, this hook having a lower weighted arm E' to automatically swing the same into engagement with the bait pipe C' as clearly shown in Fig. 2, when the bait is lowered onto the U-shaped extensions D² before mentioned.

At one side, the carriage B is provided with a laterally projecting latch piece B⁴ engageable by a lever F intermediately pivoted at f upon one of the upper side frame bars A', and having a forwardly projecting handle F' to which the upper end of a retractile spring F² is fastened, the lower end of which spring is anchored to one of the frame uprights A, thus tending to hold the lever F in engagement with the latch piece B⁴ at all times, such engagement maintaining the carriage B in its forward position against the tension of a retractile spring G, the upper forward end of which is connected to the carriage B adjacent the forward end thereof and the lower rear end of which is connected to a hook g supported by the rear cross bar A² of the frame.

Thus in operation, when a drawn cylinder is taken down, and laid out for capping, upon what is generally known as a capping horse, supporting the cylinder itself, the bait is disposed upon my improved support just described which is arranged at the head end of the cylinder supporting horse, the bait pipe C' being disposed within the U-shaped upper extensions of the supporting posts as clearly shown in Fig. 1, and being engaged by the automatic latch or hook E to prevent accidental displacement. At this time the carriage B is in its forward latched position as shown in Fig. 1, but as soon as an operator caps the cylinder or cuts the same from the bait C, he raises the handle F' of the latch lever F, releasing the carriage which moves rearwardly a short distance under the effect of the retractile spring G, moving the bait C and the cut portion of the cylinder adhering thereto, away from the main length of the cylinder to be capped, in order to prevent checking and chipping of the adjacent glass sections of the cylinder. Thereafter the bait may be readily removed from the support for subsequent use by releasing the latch or hook E therefrom, and raising the same from the U-shaped extensions D², after which the carriage B is again thrust forwardly to the latched position as shown in Fig. 1 for operation anew.

The support thus constructed is well adapted to serve the functions for which it is intended, to take all strain from the glass cylinder to be capped, to remove the bait to a point out of contact with a cylinder cut therefrom, and to effectively support the bait pending its removal for another drawing operation.

I claim:

1. A bait or drawing tool holding device including a carriage movable horizontally in a straight line and having upright bait receiving members, a stand supporting the carriage, and means for normally holding the said carriage against movement.

2. A bait or drawing tool holding device including a supporting stand, a carriage movable horizontally in a straight line in the stand and having upright bait engaging members, and latch controlled means for moving the said carriage.

3. A bait or drawing tool holding device including a spring actuated carriage movable horizontally in a straight line and having bait receiving members, a stand supporting the carriage, and a latch carried by the stand and engaging a portion of the carriage to normally prevent movement thereof.

4. A bait or drawing tool holding device comprising a supporting stand, a carriage movable horizontally in a straight line in the stand and having bait receiving members, means for securing a bait upon the said receiving members to prevent accidental displacement thereof, and latch controlled means for moving the said carriage with the bait thereon.

5. A bait or drawing tool holding device including a spring actuated carriage having side rollers, a stand having inclosed tracks for the said rollers to prevent the carriage from tilting, bait receiving members mounted on the carriage, and a latch mounted on the stand and normally engaging a portion of the carriage to prevent movement thereof.

6. A bait or drawing tool holding device including a supporting stand, a carriage movable horizontally in a straight line in the said stand, and upright bait engaging members vertically adjustable on the said carriage.

7. A bait or drawing tool holding device including a supporting stand, a carriage movable horizontally in a straight line in the said stand, a pair of upright bait engaging members vertically adjustable on the said carriage, means for securing one of said members in adjusted positions, and a spring support for the other member.

SETH B. HENSHAW.

Witnesses:
V. F. BLACK,
S. P. RICHMOND.